(12) United States Patent
Huang et al.

(10) Patent No.: US 11,500,428 B2
(45) Date of Patent: Nov. 15, 2022

(54) HINGE MODULE AND PORTABLE ELECTRONIC DEVICE

(71) Applicant: Acer Incorporated, New Taipei (TW)

(72) Inventors: Yi-Ta Huang, New Taipei (TW); Cheng-Nan Ling, New Taipei (TW); Wen-Chieh Tai, New Taipei (TW); Wu-Chen Lee, New Taipei (TW); Kun-You Chuang, New Taipei (TW)

(73) Assignee: Acer Incorporated, New Taipei (TW)

( * ) Notice: Subject to any disclaimer, the term of this patent is extended or adjusted under 35 U.S.C. 154(b) by 25 days.

(21) Appl. No.: 17/306,978

(22) Filed: May 4, 2021

(65) Prior Publication Data

US 2021/0255671 A1 Aug. 19, 2021

Related U.S. Application Data

(63) Continuation of application No. 16/824,710, filed on Mar. 20, 2020, now Pat. No. 11,036,261.

(30) Foreign Application Priority Data

Nov. 14, 2019 (TW) .................................. 108141450

(51) Int. Cl.
G06F 1/16 (2006.01)
(52) U.S. Cl.
CPC .......... G06F 1/1681 (2013.01); G06F 1/1616 (2013.01); *G06F 2212/161* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,079,921 | B2 * | 9/2018 | Chuang | H04M 1/02 |
| 10,394,062 | B1 * | 8/2019 | Song | G06F 1/1652 |
| 10,627,867 | B2 * | 4/2020 | Cheng | G06F 1/1681 |
| 10,627,873 | B2 * | 4/2020 | Lan | G06F 1/1616 |
| 10,837,209 | B2 * | 11/2020 | Lin | G06F 1/1616 |
| 11,048,296 | B2 * | 6/2021 | Hsu | G06F 1/1652 |
| 11,061,444 | B2 * | 7/2021 | Nakamura | G06F 1/162 |
| 11,385,686 | B2 * | 7/2022 | Ai | G06F 1/1616 |
| 2018/0230726 | A1 * | 8/2018 | Chen | E05D 11/10 |
| 2018/0341295 | A1 * | 11/2018 | Lan | G06F 1/1679 |
| 2019/0179373 | A1 * | 6/2019 | Cheng | H04M 1/02 |
| 2020/0166974 | A1 * | 5/2020 | Ai | G06F 1/1681 |
| 2020/0241604 | A1 * | 7/2020 | Nakamura | G06F 1/1618 |
| 2020/0256099 | A1 * | 8/2020 | Lin | E05D 11/06 |
| 2020/0371553 | A1 * | 11/2020 | Hsu | G06F 1/1624 |
| 2022/0113770 | A1 * | 4/2022 | Kang | G06F 1/1681 |
| 2022/0116489 | A1 * | 4/2022 | Nagai | F16C 11/04 |

\* cited by examiner

*Primary Examiner* — Lisa Lea-Edmonds
(74) *Attorney, Agent, or Firm* — JCIPRNET

(57) ABSTRACT

A hinge module is provided, including a first bracket, a guiding rod movably assembled to the first bracket, an elastic member connected between the first bracket and the guiding rod, a second bracket pivotally connected to the guiding rod, and a linking rod pivotally connected between the first and the second brackets. In a process of the first and the second brackets rotating relative to each other, the guiding rod moves relative to the first bracket to deform the elastic member. A portable electronic device is also provided.

20 Claims, 4 Drawing Sheets

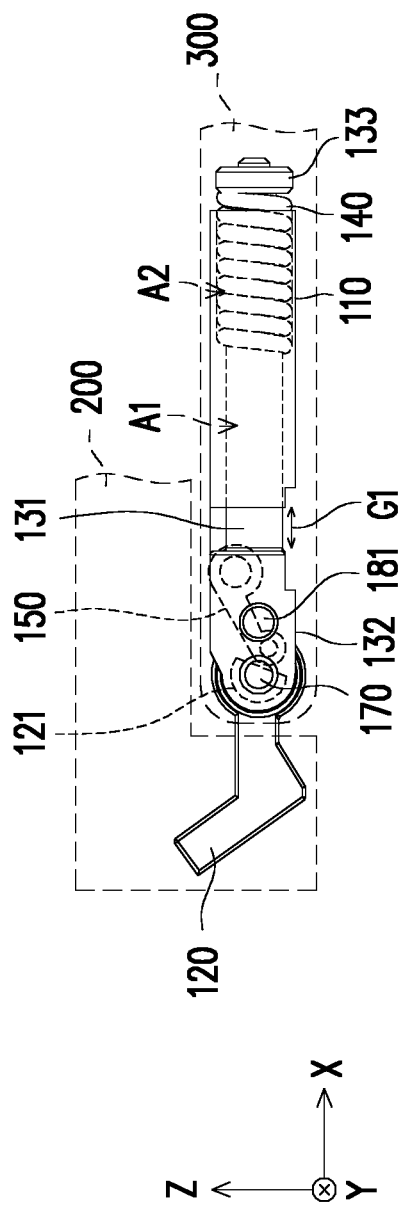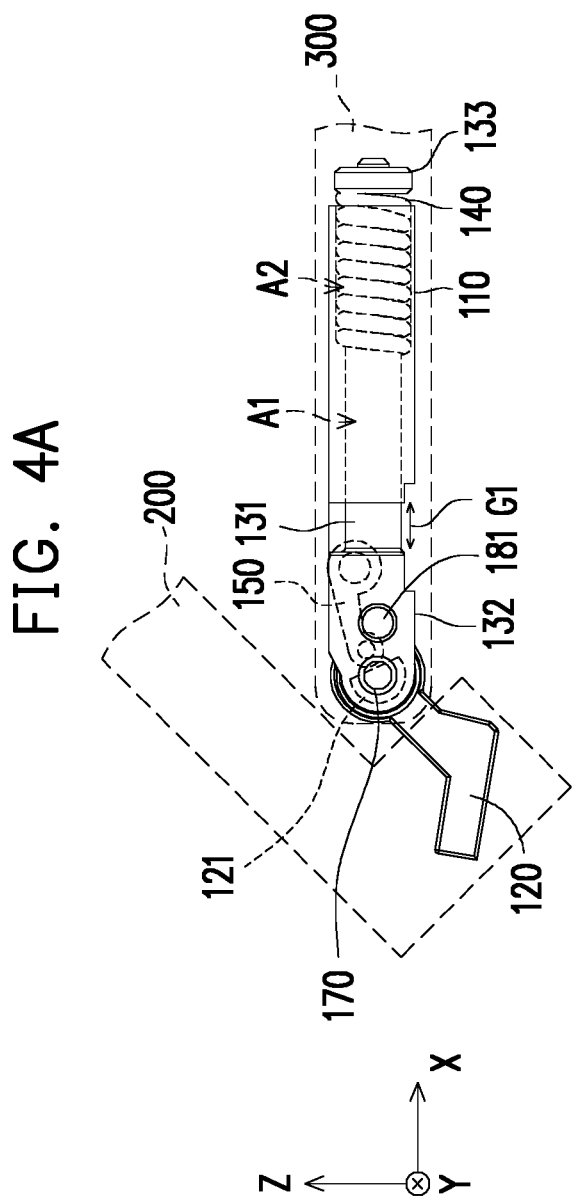
FIG. 4A
FIG. 4B

HINGE MODULE AND PORTABLE ELECTRONIC DEVICE

CROSS-REFERENCE TO RELATED APPLICATION

This application is a continuation application of and claims the priority benefit of a prior application Ser. No. 16/824,710, filed on Mar. 20, 2020, now allowed. The prior application claims the priority benefit of Taiwan application serial no. 108141450, filed on Nov. 14, 2019. The entirety of each of the above-mentioned patent applications is hereby incorporated by reference herein and made a part of this specification.

BACKGROUND

Technical Field

The disclosure relates to a hinge module and a portable electronic device.

Description of Related Art

Portable computing devices such as handheld computers, portable computers, laptops, tablets, and personal digital assistants (PDAs) have become very common. In general, a portable computing device uses a base unit and a display assembly configured for the display of the base unit for the user to operate and watch. In particular, as the technology of touch display advances with time, for such portable computers, touch screen has gradually become an essential part.

Take a laptop as an example, a hinge is provided between the two bodies as a mechanism allowing the bodies to move relative to each other. However, if a touch screen is equipped, the hinge is also required to sustain the force that the user applies on the touch screen when the bodies are unfolded. Furthermore, a cable connected between the bodies also needs to pass through the hinge structure. Therefore, how to meet the requirements of operation of the user while maintaining the supporting force and structural strength of the hinge is an issue that the designers need to address.

In general, as laptops are developed to be thinner, lighter and smaller, the sizes of the components therein are being reduced accordingly. Consequently, the structural strength may be impaired. For example, when the bodies of a laptop are folded up, since the size is reduced, a gap may be formed between the bodies due to insufficient torsion of the hinge. It may also be necessary to dispose other engagement mechanisms, such as hooks and magnets, so as to fully close up the bodies.

SUMMARY

The disclosure provides a hinge module and a portable electronic device, in which through coordination between a guiding rod and an elastic member, the elastic member is deformed while a first bracket and a second bracket rotate relative to each other, and the torsion required by the bodies is provided according to the state of the elastic member so as to meet the requirements of maintaining or changing the state of the bodies.

A hinge module of the disclosure is adapted for a portable electronic device. The hinge module includes a first bracket, a guiding rod, an elastic member, a second bracket, and a linking rod. The guiding rod is movably assembled to the first bracket. The elastic member abuts between the guiding rod and the first bracket. The second bracket is pivotally connected to the guiding rod. The linking rod is pivotally connected between the first bracket and the second bracket. In a process of the first bracket and the second bracket rotating relative to each other, the guiding rod moves relative to the first bracket to deform the elastic member.

A portable electronic device of the disclosure includes a first body, a second body, a first bracket, a guiding rod, an elastic member, a second bracket, and a linking rod. The first bracket is disposed on the first body, and the second bracket is disposed on the second body and pivotally connected to the guiding rod. The guiding rod is movably assembled to the first bracket. The elastic member abuts between the guiding rod and the first bracket. The second bracket is pivotally connected to the guiding rod. The linking rod is pivotally connected between the first bracket and the second bracket. In a process of the first body and the second body rotating relative to each other to be folded or unfolded, the first bracket and the second bracket rotate relative to each other to drive the guiding rod to move relative to the first bracket to deform the elastic member.

Based on the above, in the hinge module, the guiding rod movably disposed through the first bracket is disposed between the first bracket and the second bracket, and the linking rod is pivotally connected to both the first bracket and the second bracket, so the first bracket, the guiding rod, the linking rod, and the second bracket form a linking rod mechanism that allows the first bracket and the second bracket to rotate relative to each other and allows the guiding rod to move back and forth relative to the first bracket with the relative rotation. Then, by disposing the elastic member between the first bracket and the guiding rod, the relative movement between the first bracket and the guiding rod deforms the elastic member, so that the elastic force of the elastic member can be fed back to the above-mentioned relative rotation motion, thereby providing the first bracket and the second bracket with the torsion required for relative rotation.

Accordingly, by combining the elastic force generating process of the elastic member with the above-described linking rod mechanism, when the bodies of the portable electronic device are rotated relative to each other to be folded or unfolded, the elastic force of the elastic member can provide the corresponding torsion according to the folded or unfolded state and provide the supporting force required to maintain the state for the user to feel "light opening and heavy closing". Hence, the supporting force and the feel are not impaired as the bodies are made thinner and lighter.

In order to make the aforementioned and other features and advantages of the disclosure more comprehensible, embodiments accompanied with drawings are described in detail below.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 4A to FIG. 4D are side views respectively showing the hinge module in different states.

DETAILED DESCRIPTION OF DISCLOSED EMBODIMENTS

Figure 1:
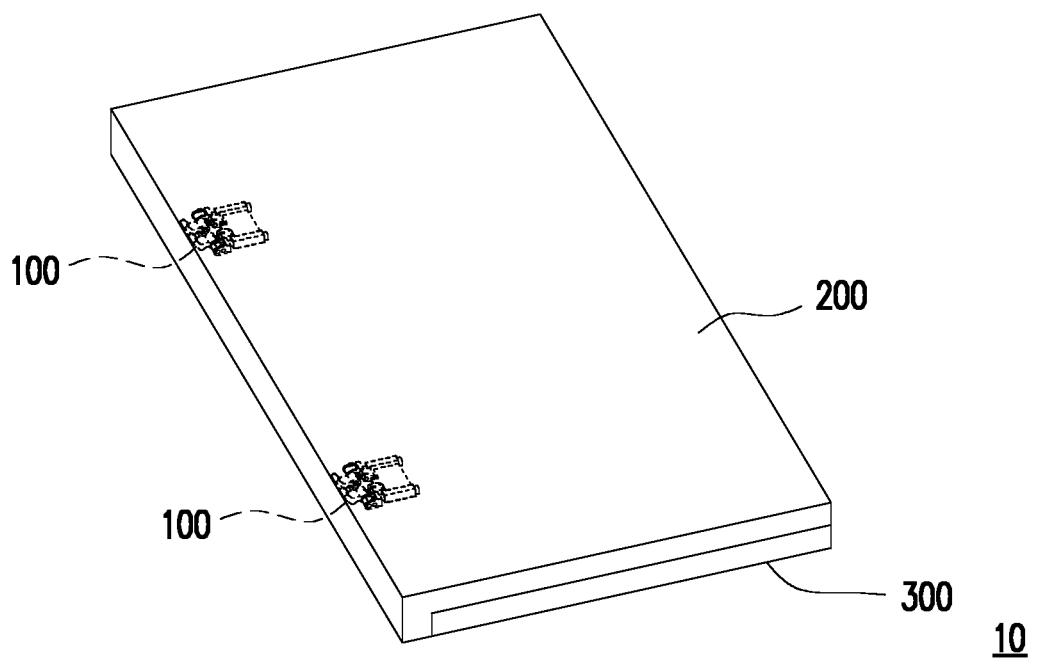
FIG. 1 is a schematic view of a portable electronic device according to an embodiment of the disclosure.
Figure 2:
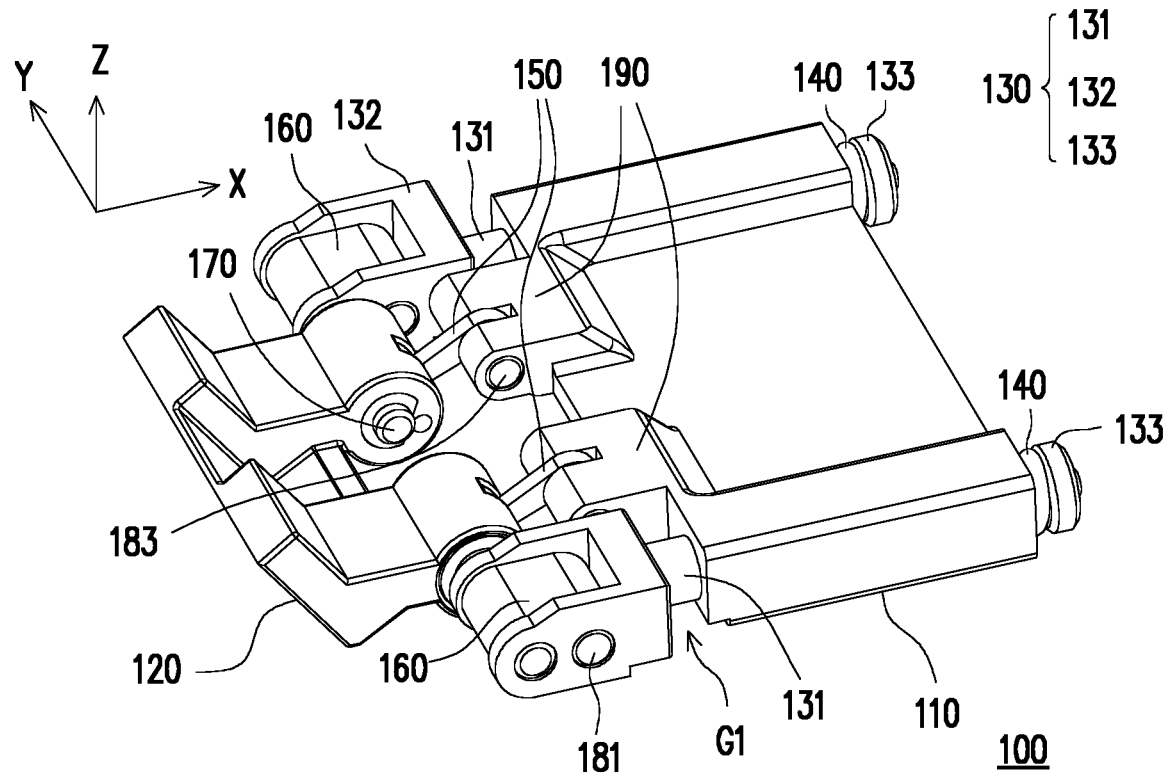
FIG. 2 is a schematic view of a hinge module.

FIG. 1 is a schematic view of a portable electronic device according to an embodiment of the disclosure. FIG. 2 is a schematic view of a hinge module. Cartesian coordinates X-Y-Z are also provided to facilitate description of the components. Referring to FIG. 1 and FIG. 2, in the present embodiment, the portable electronic device 10 includes a body 200, a body 300, and the hinge module 100, wherein the body 200 and the body 300 are allowed to rotate relative to each other to be folded or unfolded through the hinge module 100. Although a pair of hinge modules 100 is shown here, the disclosure is not intended to limit the number of the hinge modules 100 disposed in the portable electronic device 10.

Figure 3:
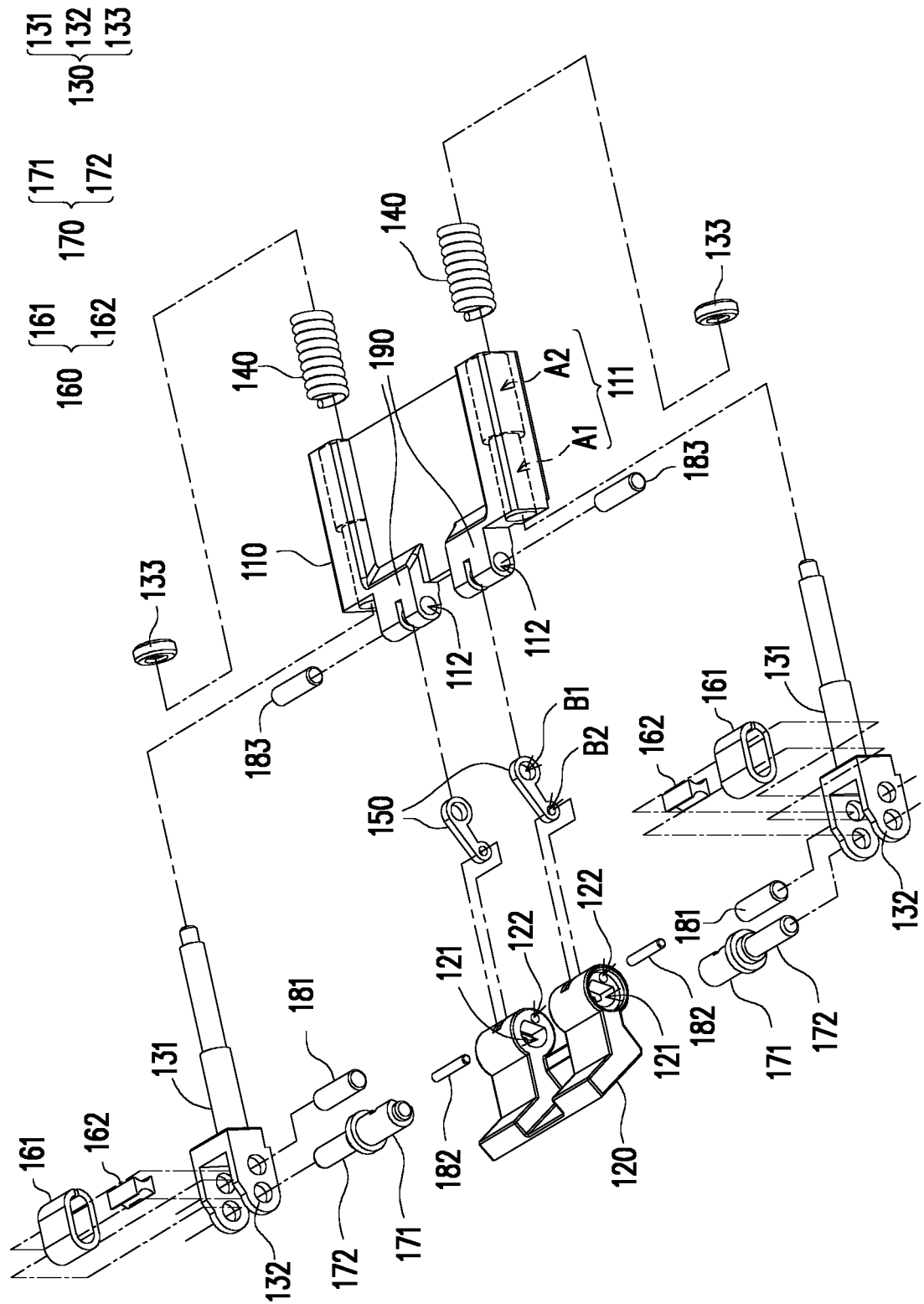
FIG. 3 is an exploded view of the hinge module of FIG. 2.

FIG. 3 is an exploded view of the hinge module of FIG. 2. Referring to FIG. 2 and FIG. 3, it should be noted that although the components of the hinge module 100 shown in FIG. 3 are illustrated in pairs, the number of the components is not limited thereto.

In the embodiment, the hinge module 100 includes a first bracket 110, a guiding rod 130, an elastic member 140, a second bracket 120, and a linking rod 150. The first bracket 110 is disposed on the body 300. The second bracket 120 is disposed on the body 200. The guiding rod 130 is movably assembled to the first bracket 110. The elastic member 140 abuts between the guiding rod 130 and the first bracket 110. The second bracket 120 is pivotally connected to the guiding rod 130. The linking rod 150 is pivotally connected between the first bracket 110 and the second bracket 120.

Specifically, the first bracket 110 is disposed on the body 300, and the first bracket 110 has a passage 111 on the rear side and a shaft hole 112 on the front side. Referring to FIG. 2 and FIG. 3, the passage 111 extends along the X axis and the shaft hole 112 extends along the Y axis. The guiding rod 130 includes a rod body 131, a connection part 132, and an abutting part 133. The rod body 131 is connected between the connection part 132 and the abutting part 133. The rod body 131 is movably disposed through the passage 111 of the first bracket 110. The elastic member 140 is disposed through the rod body 131 and abuts between the abutting part 133 and the first bracket 110. The second bracket 120 is pivotally connected to the connection part 132 of the guiding rod 130. As shown in FIG. 3, the passage 111 includes sections A1 and A2 that have different hole diameters, wherein the hole diameter of the section A1 is smaller than the hole diameter of the section A2. A step is formed in the passage 111 so that one end of the elastic member 140 abuts the step and the other end of the elastic member 140 abuts the abutting part 133.

Referring to FIG. 3, the connection part 132 of the guiding rod 130 is an "n"-shaped groove structure, and the second bracket 120 is pivotally connected to the connection part 132 via a hinge 170. Furthermore, the hinge 170 has shaft parts 171 and 172, wherein the shaft part 171 is fitted to the shaft hole 121 of the second bracket 120 for them to move synchronously, and the shaft part 172 maintains a pivotal connection relationship with torsion with the connection part 132 through a first torsion part 160. More specifically, the hinge module 100 further includes a shaft 181, and the first torsion part 160 includes a torsion member 161 and a filler member 162. The shaft part 172 passes through the torsion member 161 after passing through the side plate of the connection part 132. Similarly, the shaft 181 passes through the torsion member 161 after passing through the side plate of the connection part 132, and the filler member 162 abuts between the shaft part 172 and the shaft 181 to press the torsion member 161, the filler member 162, the shaft part 172, and the shaft 181 close together. Therefore, when the shaft part 172 and the shaft 181 are pivoted within the torsion member 161, a frictional force is generated between the shaft part 172, the shaft 181, the filler member 162, and the torsion member 161. As shown in FIG. 3, the torsion member 161 is a non-closed (C-shaped) member having a lateral opening to be elastically deformed, so that the second bracket 120 and the connection part 132 of the guiding rod 130 can generate torsion during pivoting.

In addition, the hinge module 100 further includes shafts 182 and 183. After one end of the linking rod 150 is moved into a slit of the second bracket 120, a pivot hole B2 of the linking rod 150 is pivotally connected to the shaft 182 disposed through the shaft hole 122. A pivot hole B1 at the other end of the linking rod 150 is pivotally connected to the shaft 183 disposed through the shaft hole 112. Here, the structure having the shaft hole 112 may be regarded as a second torsion part 190 of the embodiment, which may have a structural design similar to that of the first torsion part 160 for the second torsion part 190 to generate the required torsion when the linking rod 150 and the first bracket 110 rotate relative to each other. The disclosure is not intended to limit the position of the torsion part. The required torsion may be effectively generated if the torsion part is disposed between adjacent members that pivot relative to each other in the hinge module 100.

Based on the above, with configuration of the members such as the first bracket 110, the second bracket 120, the guiding rod 130, the elastic member 140, and the linking rod 150, the hinge module 100 is provided with a driving mode of a linking rod mechanism, wherein the axial direction of the pivotal connection between the first bracket 110 and the second bracket 120, the axial direction of the pivotal connection between the linking rod 150 and the first bracket 110, and the axial direction of the pivotal connection between the linking rod 150 and the second bracket 120 are parallel to one another. When the body 200 and the body 300 are pivoted relative to each other to be folded or unfolded, the motion mode in which the first bracket 110 and the second bracket 120 rotate relative to each other is converted into the motion mode in which the guiding rod 130 is driven to move relative to the first bracket 110, which further deforms the elastic member 140. Details will be provided later.

Referring to FIG. 2 again, as the motion mechanism described above, since the guiding rod 130 of the embodiment is allowed to move relative to the first bracket 110 along the X axis and cause the elastic member 140 to be deformed by the force, it means that a movable gap G1 is formed between the connection part 132 of the guiding rod 130 and the first bracket 110. FIG. 4A to FIG. 4D are side views respectively showing the hinge module in different states. In the embodiment, referring to FIG. 2, FIG. 3, and FIG. 4A first, the hinge module 100 is in the same state in these figures. That is, the body 200 and the body 300 are in a state of being folded and closed.

Figure 4C:
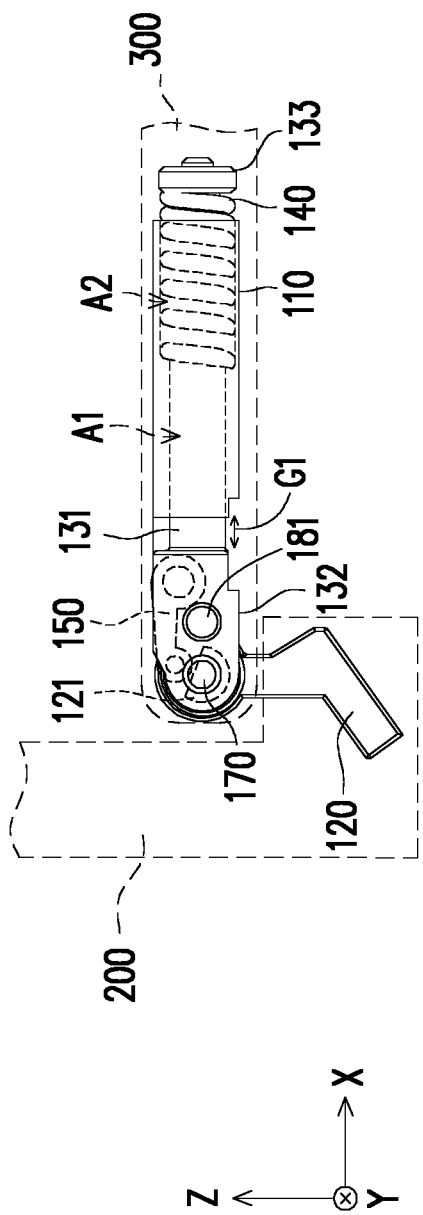
Figure 4D:
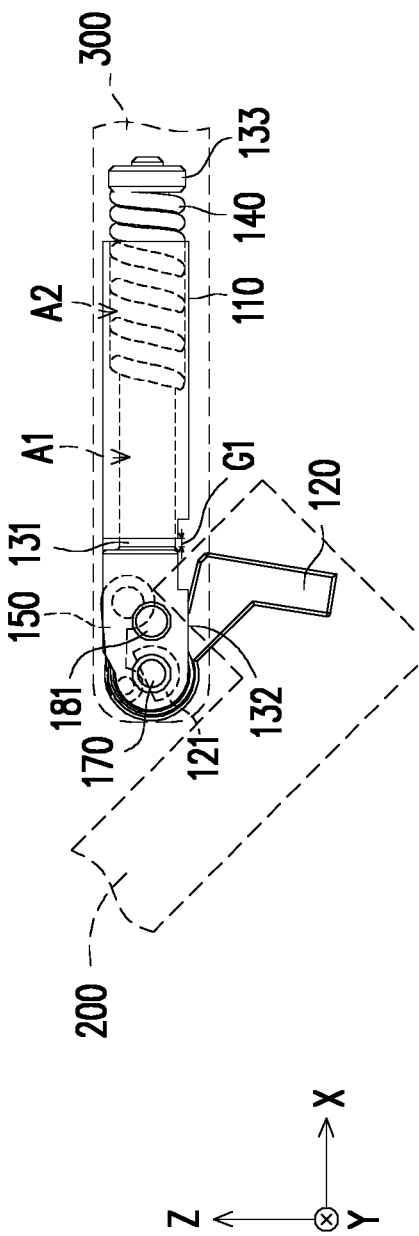

Referring to FIG. 4A and FIG. 4D first, the body 200 and the body 300 are in a folded and closed state in FIG. 4A and in an unfolded state in FIG. 4D, and the elastic member 140 is in a compressed state in FIG. 4A and in a relaxed state in FIG. 4D. Here, the relaxed state represents that the elastic member 140 has minimum or no deformation. Accordingly, in the embodiment, the elastic member 140 causes the hinge module 100 to gradually release the elastic force as the body 200 and the body 300 are unfolded (the elastic member 140 becomes less deformed), and gradually increase the elastic force as the body 200 and the body 300 are closed (the elastic member 140 becomes more deformed). The process from FIG. 4A to FIG. 4D is based on the body 300 and the first bracket 110, and the body 200 (and the second bracket 120) is gradually pivoted and unfolded relative to the body 300 (and the first bracket 110).

Referring to FIG. 4A and FIG. 4B, the process here shows that the body 200 and the body 300 are unfolded starting from the folded and closed state. In this process, the linking rod 150 moves toward the positive X-axis direction, and the guiding rod 130 moves toward the negative X-axis direction. In other words, the movable gap G1 is increased (that is, the movable gap G1 of FIG. 4B is substantially larger than the movable gap G1 of FIG. 4A), and the deformation of the elastic member 140 is further increased. That is to say, in the state shown in FIG. 4B, the movable gap G1 reaches the maximum value, and the elastic member 140 has the maximum deformation.

Next, referring to FIG. 4B to FIG. 4D in sequence, the rotation of the second bracket 120 continues and causes the linking rod 150 to gradually move toward the negative X-axis direction (away from the first bracket 110). Accordingly, the movable gap G1 is gradually shortened, and the guiding rod 130 is gradually moved toward the positive X-axis direction (the connection part 132 of the guiding rod 130 moves toward the first bracket 110). As described above, the elastic member 140 of FIG. 4B is in a state close to extreme compression. The process of FIG. 4B to FIG. 4D is equivalent to a process of gradually relaxing the elastic member 140 to release the elastic force, which at the same time causes the movable gap G1 to be gradually reduced until the movable gap G1 reaches the minimum value as shown in FIG. 4D. At this time, the elastic member 140 has minimum or even no deformation. Here, the movable gap G1 shown in FIG. 4D is smaller than the movable gap G1 shown in FIG. 4C, the movable gap G1 shown in FIG. 4C is smaller than the movable gap G1 shown in FIG. 4A, and the movable gap G1 shown in FIG. 4A is smaller than the movable gap G1 shown in FIG. 4B.

It is also known from the above that the process from FIG. 4D to FIG. 4A represents a process of folding and closing the body 200 and the body 300. In other words, in the hinge module 100 of the embodiment, with configuration of the above members, the relative positions of the first bracket 110 and the second bracket 120 correspond to the change of the elastic force of the elastic member 140, which also means that the relative positions of the body 200 and the body 300 correspond to the change of the elastic force of the elastic member 140.

It should be noted that FIG. 4B shows a state where the movable gap G1 reaches the maximum value and the elastic member 140 has the maximum deformation, which also means that when the user closes the body 200 and the body 300 (that is, gradually returning to FIG. 4A from FIG. 4D), the linking rod 150 is moved reversely by the process of FIG. 4B to FIG. 4A (the linking rod 150 moves toward the positive X-axis direction as shown in FIG. 4D to FIG. 4B, and the linking rod 150 moves toward the negative X-axis direction as shown in FIG. 4B to FIG. 4A, thereby causing the linking rod 150 to "pull back"), and the reverse stroke ensures the closed state of FIG. 4A. That is to say, when the user unfolds the body 200 and the body 300, first it is required to overcome the movement stroke of the linking rod 150 required in FIG. 4A to FIG. 4B and apply a force to further deform the elastic member 140 (since the elastic member 140 of FIG. 4B has the maximum deformation), and then the unfolding process from FIG. 4B to FIG. 4D can be smoothly performed. The above mechanism serves as an operation threshold when the user wants to unfold the body 200 and the body 300, and it also means that the body 200 and the body 300 of the portable electronic device 10 are stably maintained in the fully closed state of FIG. 4A due to the operation threshold.

It should be noted that the elastic force of the elastic member 140 constantly drives the connection part 132 of the guiding rod 130 toward the first bracket 110, which is equivalent to constantly driving the linking rod 150 toward the first bracket 110. Due to the extreme position created in FIG. 4B (where the movable gap G1 has the maximum value and the elastic member 140 has the maximum deformation), the direction of movement of the linking rod 150 and the driving direction of the elastic member 140 are opposite in the process of FIG. 4A to FIG. 4B, or the direction of movement of the linking rod 150 and the driving direction in which the user applies a force to deform the elastic member 140 are opposite in the process of FIG. 4B to FIG. 4A, so as to create the above-described operation threshold.

Further, in the process of unfolding the body 200 and the body 300 (FIG. 4B to FIG. 4D), once the state of FIG. 4B is overcome, it means that the unfolding of the body 200 and the body 300 may be facilitated by the elastic force of the elastic member 140, so the force that the user needs to apply to unfold the body 200 and the body 300 is reduced. Conversely, when the user wants to close the portable electronic device 10 from the state shown in FIG. 4D to the state shown in FIG. 4B, the user needs to gradually compress the elastic member 140, so the user needs to gradually increase the force. Accordingly, the hinge module 100 of the embodiment gives the user the operation feeling of "light opening and heavy closing" when the user opens and closes the body 200 and the body 300.

In this way, even if the body 200 and the body 300 are designed to be thinner, lighter, and smaller, the force for keeping the body 200 and the body 300 open or close can be provided by the elastic force generated as described above without being affected.

In other words, for the hinge module 100, the configuration of the linking rod mechanism in the embodiment converts the relative pivoting between the first bracket 110 and the second bracket 120 into the movement of the guiding rod 130 relative to the first bracket 110 only along the X axis, which simplifies the motion output of the linking rod mechanism and improves the stability of output of the linking rod mechanism as the guiding rod 130 is restricted by the passage 111 of the first bracket 110. In other words, the designer only needs to pay attention to the motion state of the guiding rod 130 to control the motion state of the hinge module 100.

In terms of the conventional hinge module, the torsion structure is mostly disposed directly on the hinge, so the torsion generated is often reduced due to the thinner and lighter design. In contrast thereto, the hinge module of the embodiment is provided with the above-described linking rod mechanism, and correspondingly the elastic member 140 is disposed between the guiding rod 130 and the first bracket 110 (to abut between the first bracket 110 and the guiding rod 130). Since the guiding rod 130, the passage 111, and the elastic member 140 are disposed along the X axis, even if the portable electronic device 100 is made lighter and thinner, the reduction along the Z axis is not impaired (the reduction along the Z axis may be regarded as equivalent to the thickness reduction of the body 200 and the body 300). Therefore, the hinge module 100 is provided with sufficient torsion without being affected by the thinner and lighter design.

To conclude the above, in the hinge module of the above embodiment of the disclosure, the guiding rod movably disposed through the first bracket is disposed between the first bracket and the second bracket, and the linking rod is pivotally connected to both the first bracket and the second bracket, so the first bracket, the guiding rod, the linking rod, and the second bracket form a linking rod mechanism that allows the first bracket and the second bracket to rotate relative to each other and allows the guiding rod to move back and forth relative to the first bracket with the relative rotation. Then, by disposing the elastic member between the first bracket and the guiding rod, the relative movement between the first bracket and the guiding rod deforms the elastic member, so that the elastic force of the elastic member can be fed back to the above-mentioned relative rotation motion, thereby providing the first bracket and the second bracket with the torsion required for relative rotation.

Accordingly, by combining the elastic force generating process of the elastic member with the above-described linking rod mechanism, when the bodies of the portable electronic device are rotated relative to each other to be folded or unfolded, the elastic force of the elastic member can provide the corresponding torsion according to the folded or unfolded state and provide the supporting force required to maintain the state for the user to feel "light opening and heavy closing". Hence, the supporting force and the feel are not impaired as the bodies are made thinner and lighter.

The above-described linking rod mechanism also provides an operation threshold for the operation stroke before the bodies are fully closed. That is, the direction of movement of the linking rod is reverse to the driving direction of the elastic force of the elastic member, so as to ensure that the bodies are in the fully closed state.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A hinge module for a portable electronic device, the hinge module comprising:
a first bracket;
a guiding rod slidably assembled to the first bracket;
an elastic member abutting between the guiding rod and the first bracket; and
a second bracket pivotally connected to the guiding rod to be pivoted and slid relative to the first bracket, wherein the elastic member is deformed via the sliding of the guiding rod relative to the first bracket in a process of the first bracket and the second bracket rotating relative to each other.

2. The hinge module according to claim 1, wherein the guiding rod comprises a rod body, a connection part, and an abutting part, wherein the rod body is connected between the connection part and the abutting part, the rod body is movably disposed through the first bracket, the elastic member is disposed through the rod body and abuts between the abutting part and the first bracket, and the second bracket is pivotally connected to the connection part.

3. The hinge module according to claim 2, wherein a movable gap exists between the connection part and the first bracket, and the second bracket rotates relative to the first bracket to drive the guiding rod to change the movable gap.

4. The hinge module according to claim 3, wherein the elastic member has a maximum deformation when the second bracket rotates relative to the first bracket to cause the movable gap to reach a maximum value.

5. The hinge module according to claim 3, wherein the elastic member has no deformation or a minimum deformation when the second bracket rotates relative to the first bracket to cause the movable gap to reach a minimum value.

6. The hinge module according to claim 2, further comprising a first torsion part disposed on the connection part and abutting between the second bracket and the guiding rod.

7. The hinge module according to claim 2, wherein the elastic force of the elastic member constantly drives the connection part toward the first bracket.

8. The hinge module according to claim 1, wherein an axial direction of pivotal connection between the first bracket and the second bracket, an axial direction of pivotal connection between the linking rod and the first bracket, and an axial direction of pivotal connection between the linking rod and the second bracket are parallel to one another.

9. The hinge module according to claim 1, further comprising:
a linking rod pivotally connected between the first bracket and the second bracket to form a linkage with the first bracket, the second bracket, and the guiding rod.

10. The hinge module according to claim 9, further comprising:
a second torsion component disposed on the first bracket and abutting between the linking rod and the first bracket.

11. A portable electronic device, comprising:
a first body;
a first bracket disposed on the first body;
a guiding rod slidably assembled to the first bracket;
an elastic member abutting between the guiding rod and the first bracket;
a second body; and
a second bracket disposed on the second body and pivotally connected to the guiding rod, wherein the elastic member is deformed via the sliding of the guiding rod relative to the first bracket in a process of the first bracket and the second bracket rotating relative to each other.

12. The portable electronic device according to claim 11, wherein the guiding rod comprises a rod body, a connection part, and an abutting part, wherein the rod body is connected between the connection part and the abutting part, the rod body is movably disposed through the first bracket, the elastic member is disposed through the rod body and abuts between the abutting part and the first bracket, and the second bracket is pivotally connected to the connection part.

13. The portable electronic device according to claim 12, wherein a movable gap exists between the connection part and the first bracket, and the second bracket rotates relative to the first bracket to drive the guiding rod to change the movable gap.

14. The portable electronic device according to claim 13, wherein when the second bracket rotates relative to the first bracket to cause the movable gap to reach a maximum value, the elastic member has a maximum deformation, and the first body and the second body are folded relatively.

15. The portable electronic device according to claim 13, wherein when the second bracket rotates relative to the first bracket to cause the movable gap to reach a minimum value, the elastic member has no deformation or a minimum deformation, and the first body and the second body are unfolded relatively.

16. The portable electronic device according to claim 12, wherein the hinge module further comprises a first torsion part disposed on the connection part and abutting between the second bracket and the guiding rod.

17. The portable electronic device according to claim 12, wherein the elastic force of the elastic member constantly drives the connection part toward the first bracket.

18. The portable electronic device according to claim 11, wherein an axial direction of pivotal connection between the first bracket and the second bracket, an axial direction of pivotal connection between the linking rod and the first bracket, and an axial direction of pivotal connection between the linking rod and the second bracket are parallel to one another.

19. The portable electronic device according to claim 11, further comprising:
   a linking rod pivotally connected between the first bracket and the second bracket to form a linkage with the first bracket, the second bracket, and the guiding rod.

20. The portable electronic device according to claim 19, further comprising:
   a second torsion component disposed on the first bracket and abutting between the linking rod and the first bracket.

* * * * *